United States Patent [19]

Lambrecht

[11] 4,185,317

[45] Jan. 22, 1980

[54] ANODE AND CATHODE LEAD WIRE ASSEMBLY FOR SOLID ELECTROLYTIC CAPACITORS

[75] Inventor: Richard A. Lambrecht, Greenville, S.C.

[73] Assignee: Union Carbide Corporation, New York, N.Y.

[21] Appl. No.: 863,220

[22] Filed: Dec. 22, 1977

[51] Int. Cl.² .................... H01G 9/00; B01J 17/00
[52] U.S. Cl. ...................... 361/433; 29/570; 361/271; 357/68
[58] Field of Search .......... 361/433, 271, 272; 29/570; 357/68

[56] References Cited

U.S. PATENT DOCUMENTS

| | | | |
|---|---|---|---|
| 3,970,903 | 7/1976 | Shirn | 361/433 |
| 3,997,821 | 12/1976 | Sternbeck | 361/433 |
| 4,016,464 | 4/1977 | Voyles et al. | 361/433 |
| 4,068,291 | 1/1978 | Pierpont | 361/433 |
| 4,070,747 | 1/1978 | Lambrecht | 29/570 |

FOREIGN PATENT DOCUMENTS 2728057 12/1977 Fed. Rep. of Germany ........... 361/433

Primary Examiner—Andrew J. James
Attorney, Agent, or Firm—Frederick J. McCarthy, Jr.

[57] ABSTRACT

A lead wire assembly is provided which permits soldering connections and welding connections to be made to the anode and cathode of solid electrolytic capacitor body while applying force in a single direction to the lead wire assembly during soldering and welding. Automatic processing of a multiplicity of capacitor bodies is facilitated by the present invention.

2 Claims, 10 Drawing Figures

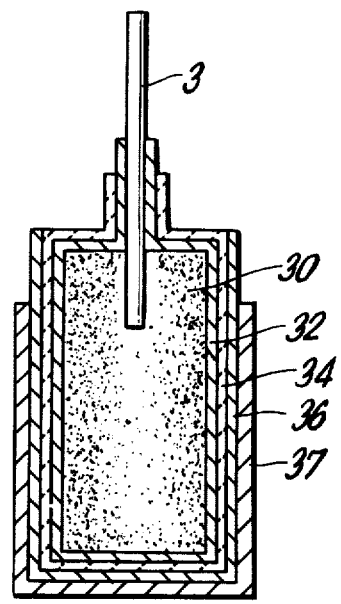
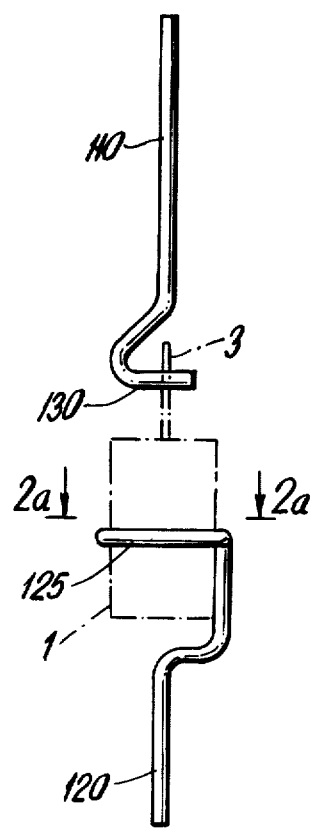
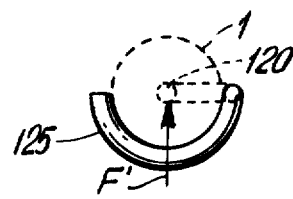
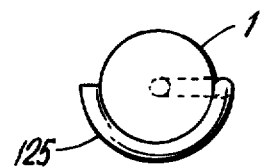
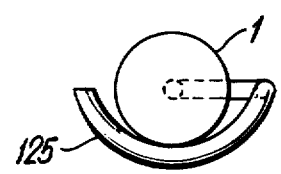
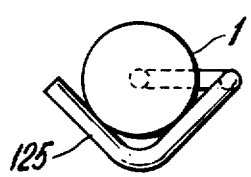

ANODE AND CATHODE LEAD WIRE ASSEMBLY FOR SOLID ELECTROLYTIC CAPACITORS

The present invention is directed to a lead wire assembly for solid electrolytic capacitors. More particularly, the present invention is directed to the attachment of cathode and anode lead wires to a solid electrolytic capacitor body.

Solid electrolytic capacitors, as is well known in the art, commonly comprise a generally cylindrical capacitor body having an outer cathode layer surrounding an anode of film forming metal, e.g., tantalum.

The anode is formed with an axially extending lead out rod or wire, to which an anode lead wire is subsequently attached, e.g., by welding, while a cathode lead wire is subsequently attached, e.g., by soldering, to the cathode layer.

It is important to provide a capacitor body as above-described with a negative, or cathode terminal lead which is coaxial with the cylindrical capacitor body and the anode lead.

In the past, to achieve this result, axially leaded metal cups have been used to partially enclose and electrically contact the cathode portion of capacitor body. This approach is rather expensive due to the cost of the metal cups and for other reasons. Another approach has been to solder a lead directly to the bottom of the capacitor body, i.e., the surface opposite the anode lead connection. This is a somewhat delicate operation and is accordingly expensive. A further approach is to seat the capacitor body in a preformed wire member which is joined both to the anode lead and a lateral portion of the capacitor body. After joining, the portion of the wire member between the capacitor body and anode lead is cut away. The cutting operation necessarily subjects the capacitor body and the connections thereto to undesirable mechanical shock. Also, the seating of the capacitor body in the pre-formed wire member requires, for continuous production, that the capacitor bodies be of the same length. This is not always convenient.

A further prior art method of providing the cathode lead wire is the use of a pre-shaped wire having an end portion conforming to a lateral portion of the capacitor body and a second end portion in axial alignment with the anode lead. The first end portion is joined to the capacitor body by soldering. A disadvantage of this method is the tendency for the lead wire, during joining, to move laterally over the capacitor body when subjected to the forces or the soldering operation.

The anode lead wire is usually joined to the anode lead by butt welding or lap welding of essentially coaxial leads. These techniques require very accurate alignment of the leads and the process is consequently often difficult or unreliable.

It is accordingly an object of the present invention to provide a simple and inexpensive lead wire device and assembly method for solid electrolytic capacitors.

It is further object of this invention to provide lead wire configurations that will permit improved alignment of lead wires and superior mechanical and electrical bonds to the capacitor.

Other objects will be apparent from the following description and claims taken in conjunction with the drawings wherein:

FIG. 1 shows a sectional elevation view of a conventional solid electrolytic capacitor body, FIG. 2 shows a lead wire assembly in accordance with the present invention, FIG. 2(a) shows a cross section of the device of FIG. 2, FIGS. 2(b) to 2(e) shows cross sections of a device in accordance with the present invention with capacitor bodies of different diameters.

Figure 4A:
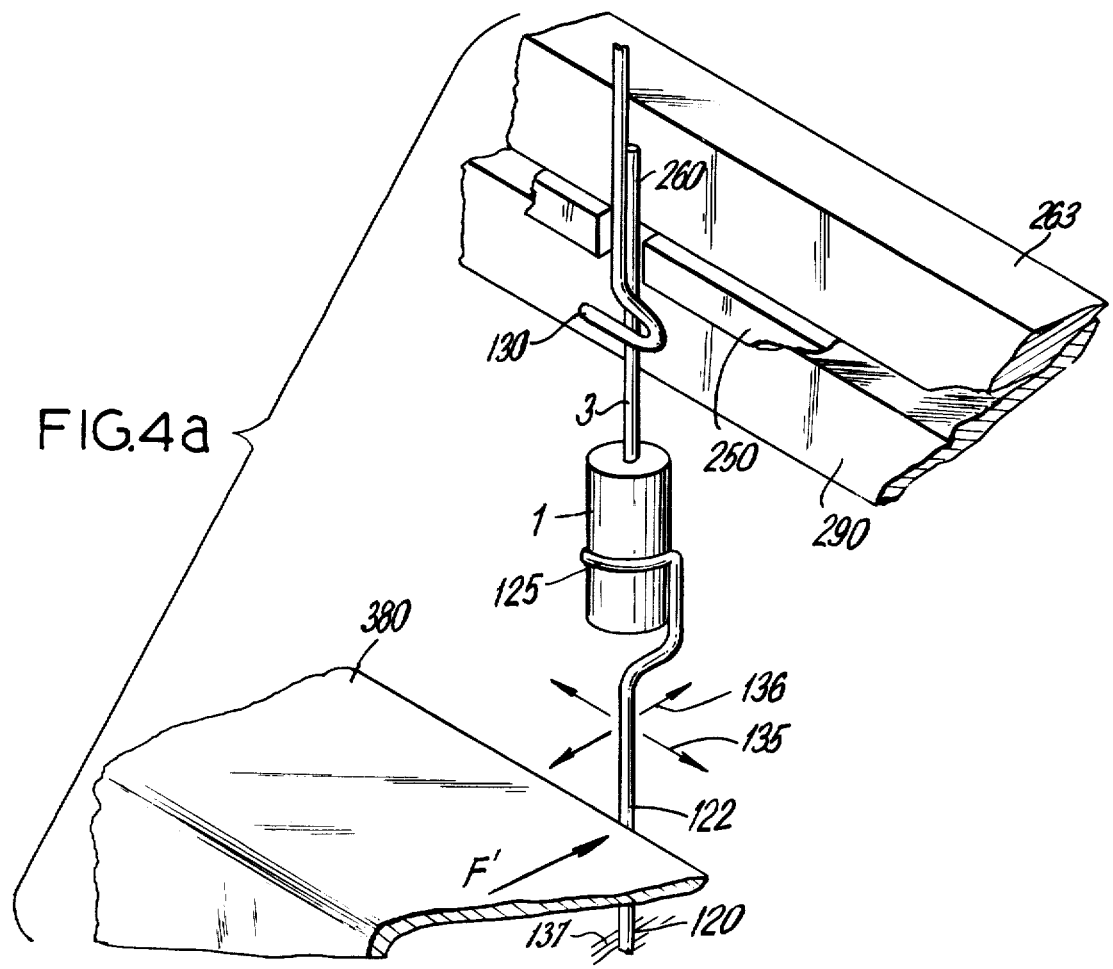
Figure 4:
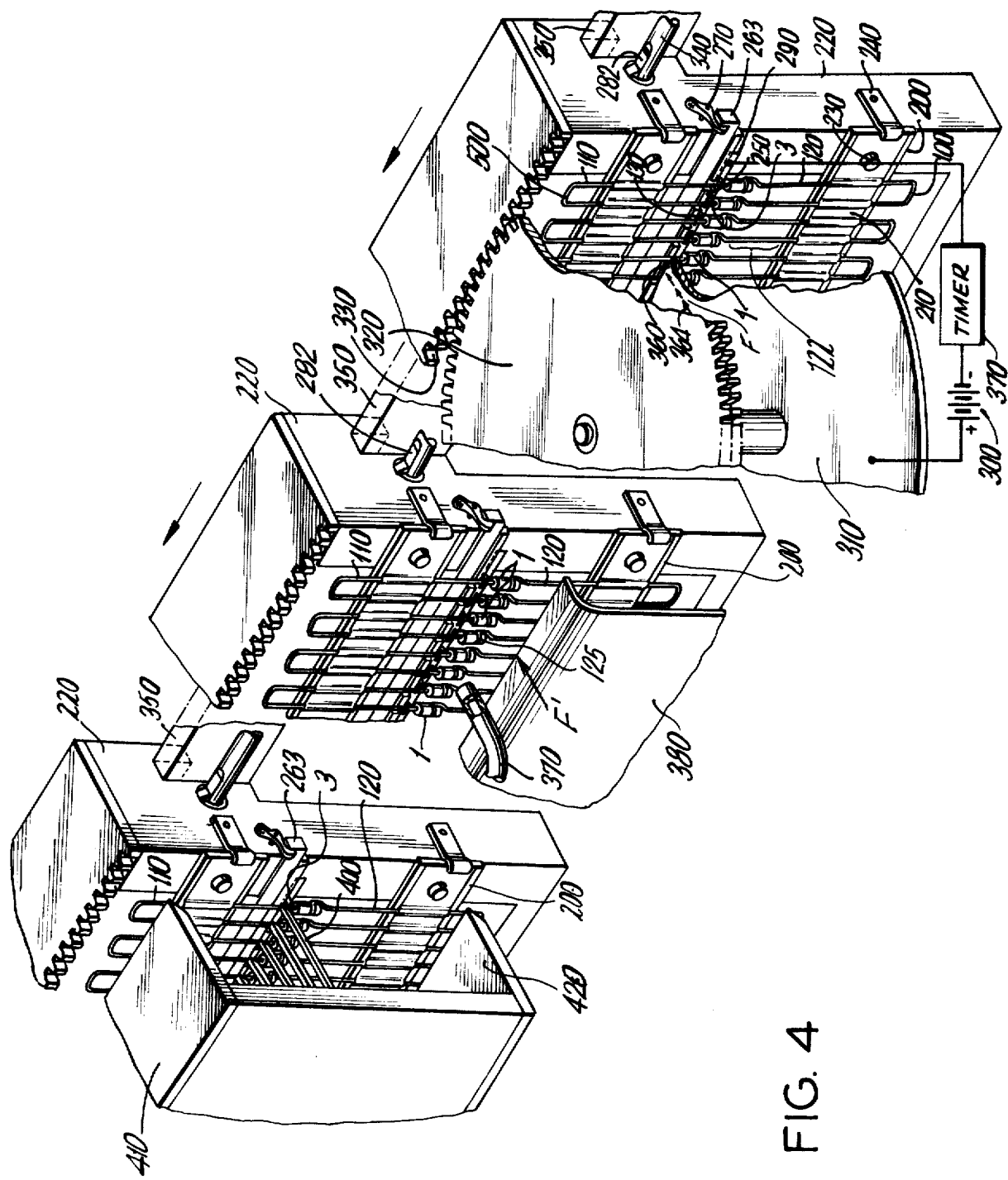

FIG. 4, and the partial view of FIG. 4(a) illustrate a particular embodiment of the method of the present invention.

With reference to the drawing, FIG. 1 shows a cylindrical capacitor body 1 comprising a generally cylindrical sintered tantalum anode body 30 having an anode lead out rod 3 electrically connected thereto and extending in longitudinal axial alignment therewith. Anode body 30 is conventionally coated with a dielectric layer of tantalum pentoxide 32. A solid layer of manganese dioxide electrolyte 34 is provided over the dielectric layer 32 and cathode layer 36, e.g., a solderable film, e.g., silver, is provided over the electrolyte layer 344. A layer of solder 37 is then provided covering the bottom and cylindrical surfaces.

With reference to FIG. 2, lead wires in accordance with the present invention are shown at 110 and 120 being formed of resilient wire, e.g., made of solder coated nickel, copperweld wire, or the like. The pair of wires 110 and 120 extend substantially along the same axis and lie substantially along a common axis with anode lead out rod 3 of capacitor body 1. Wires 110 and 120 are shown substantially coaxial and wire 110 has a lateral portion 130 which extends transverse to anode lead out rod 3 of capacitor body 1 of the type shown in FIG. 1. Wire 120 has an arcuate portion 125 which is spaced from lateral portion 130 of wire 110 and lies in a plane transverse, i.e., at a 90° angle, to the longitudinal axis of capacitor body 1 and the common plane of wire 110, transverse section 130 of wire 110, wire 120 and lead out rod 3.

Figure 3:
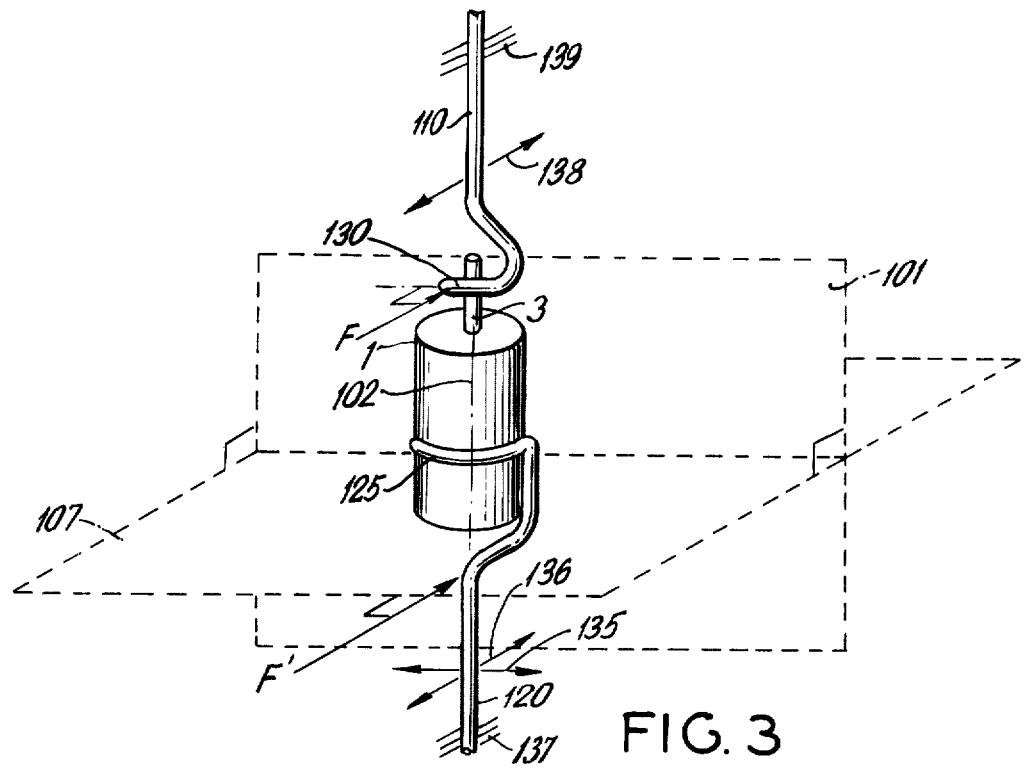
FIG. 3 is a further view in isometric of the device of FIG. 2.

Capacitor body 1 nests centrally in the generally conforming arcuate member 125 as shown in FIGS. 2(b) through 2(e); FIG. 2(d) shows a form of arcuate member 125 which is not a true curve shape but which, as in the embodiments of FIGS. 2(b), 2(c) and 2(e) generally conforms to the shape of the capacitor body and partially surrounds the capacitor body, e.g., $\frac{1}{8}$ to $\frac{1}{4}$ the circumference, and is within the scope of the present invention. FIG. 2(c) shows a capacitor body 1 which is smaller than that of FIG. 2(b) and FIG. 2(e) shows a capacitor body 1' which is larger than that of FIG. 2(b). FIG. 2(b), where the capacitor body 1 closely conforms to the shape of arcuate member 125 is a preferred arrangment due to maximum contact, however, all of the arrangements of FIGS. 2(b) and 2(e) provide a good contact for subsequent soldering. In the practice of the present invention and with reference to FIGS. 2(a) and 3, a capacitor body 1 is fixedly positioned as are the lead wires 110 and 120 as hereinafter described. A force F is applied to wire 110 as shown in FIG. 3. This force is transverse, i.e., perpendicular, to the common plane 101 of wires 110, 120, 130 and lead out rod 3 and is sufficient to provide contact between lateral portion 130 and anode lead out rode 3. While in contact, anode lead out rod 3 is conventionally welded to lateral portion 130, force F being sufficient to ensure a good weld. A force F' is applied to wire 120 usually at a point near the arcuate section 125 as also shown in FIGS. 2(a) and 3 and this force is also transverse, i.e., at a 90° angle, to the common plane 101 of wire 110, transverse section 130 of wire 110, wire 120 and lead out rod 3 and this force is sufficient to provide nesting contact between arcuate portion 125 and capacitor body 1 as shown in FIGS. 2(b) to 2(e). Due to the resilience of wire 120 and its cantilever mounting at 137, it is laterally moveable as indicated at 135, thus, enabling alignment of arcuate member 125 in a nesting contact with capacitor body 1 even if capacitor body 1 is somewhat irregular in shape or "out of line." Wire 110 is also cantilever mounted as indicated at 139 and is moveable in the direction 138 of force F to enable close contact with anode lead out rod 3. As shown in FIG. 3 the common plane 101 of wires 110, 120, 130 and lead out rod substantially contains the longitudinal axis 102 of capacitor body 1 and plane 107 substantially contains the capacitor body contacting arcuate member 125 and plane 107 is transverse to plane 101.

FIG. 4, shows an automated embodiment of the present invention. In FIG. 4, a plurality of pretinned lead wire assemblies 100 in accordance with the present invention are shown mounted on a support member 200, e.g., made of cardboard and affixed thereto by tape 210. Support member 200 is mounted on an assembly "boat" 220, e.g., made of a metal such as aluminum, by means of pins 230 and clamps 240. A slotted "comb" member 250 is affixed to boat member 220, to assist in the alignment of lead wire assemblies 500 in relation to capacitor bodies 1 which are welded at 360 to a metal process bar 263 which is fixedly clamped to boat 220 as shown at 270. Boat 220 is moveably supported on rail 350 and moved in the direction shown by pawl 282. The weld head, which has a conductive plate 290 at negative potential as indicated at 300, and a circular metal plate 310 as the positive weld electrode is fixed to rotatable toothed gear 320 which engages rack gear 330 on boat 220. Boat 220 is moved by rod 340 and boat 220 moves along rail 350 to consecutively place each anode lead out rod 3 of a capacitor body 1 at location 360 where circular plate 310 is positioned in relation to lead wire 110 such that a force F is applied to a lateral portion 130 and establishes contact between lateral portion 130 and anode lead out rod 3. The direction of this welding force F is transverse, i.e., at an angle of 90°, to the substantially common plane of wires 110, 120, 130, and lead out rod 3 as indicated at 364. While on such contact, timer 370 permits welding current flow from 300 and the anode lead out rod 3 and lateral portion 130 are welded. This welding and application of welding force is repeated as each capacitor reaches location 360. When all the capacitor bodies on boat 220 have been thus subjected to welding, boat 220 is advanced to a position where a stream of hot gas from nozzle 370 is directed toward the arcuate wire 125 and capacitor body 1 held in nesting contact by force F' to result in soldering of wire 125 to capactior body 1, by the well-known "re-flow" technique. Due to the cantilevered extension of portion 122 of wire 120 from its fixed position on member 200, portion 122 can be resiliently deformed as indicated in FIG. 4(a) at 135 and 136 to accommodate capacitor bodies of varying diameter and enable nesting contact with arcuate member 125. Any misalignment of capacitor bodies 1 is also accommodated by the resiliency of cantilever mounted wire 120. A lead clamp 380 simultaneously applies a force F' to all wires 120 as shown in FIG. 4, which places arcuate portions 125 in nesting contact with capacitor bodies, as hereinabove described. The direction of the force F' is transverse to the common plane wires 110, 120, 130, and lead out rod 3. Boat 220 is advance after the soldering of arcuate portions 125 and anode body 1 to a position where cutter 400 shown in FIG. 4 cuts the anode lead out rod 3 from process bar 263 and wires 110 and 120 are similarly severed by cutters 410 and 420. The assembled capacitor bodies are then encapsulated by techniques known in the art, tested, and are suitable for connection in circuit boards and the like. Alternatively, wires 110 and 120 can be cut before support members 200 is mounted on boat 220. Also wires 110 and 120 can be integrally formed and mounted rather than separately formed and separately mounted.

A particular advantage of the lead wire assembly of the present invention is that the substantially coaxial relationship between the resultant anode and cathode leads does not vary excessively with substantial variation in diameter of capacitor bodies which frequently occurs due to the multiple dip coatings involved in the manufacture of capacitor bodies. This advantage is due to the fact that the arcuate portion of the cathode lead wire can establish satisfactory contact with a capacitor body with relatively small displacement of the straight portion of the cathode lead wire.

What is claimed is:

1. Method for providing an anode lead wire and a cathode lead wire on a solid electrolytic capacitor having a substantially cylindrical body including an anode lead out wire extending along the longitudinal axis of said cylindrical body, a dielectric layer on the anode, and a solid electrolytic cathode layer on the dielectric layer, said method comprising: providing a pair of cantilever mounted preshaped, resilient wires, each wire of said pair of wires having resiliently deformable extended portions substantially coaxial with each other and the longitudinal axis of the cylindrical body and substantially lying in a selected plane containing the longitudinal axis of said cylindrical body, one of said pair of wires being an anode lead wire and the resiliently deformable extended portion thereof having an end portion transverse to the longitudinal axis of said cylindrical body and lying substantially in said selected plane, the other wire of said pair of wires being the cathode lead wire and the resiliently deformable extended portion thereof having an arcuate portion spaced from said end portion of said anode wire lying in a plane transverse to said selected plane, said arcuate portion having a shape generally conforming to the substantially cylindrical capacitor body; positioning said cylindrical capacitor body with respect to said anode lead wire such that said anode lead out wire of said cylindrical capacitor body is closely adjacent to said transverse end portion of said anode lead wire; positioning said cylindrical capacitor body with respect to said cathode lead wire such that the solid electrolytic cathode layer of said cylindrical capacitor body is closely adjacent to the generally conforming arcuate portion of said cathode lead wire; subjecting said resiliently deformable extended protion of said cathode lead wire to a force which is in a direction transverse to said selected plane, said force being sufficient to establish a nesting contact between said arcuate portion of said cathode lead wire and said cylindrical capacitor body; soldering said arcuate portion to said capacitor body while said force is applied; subjecting said anode lead wire to a force which is in a direction transverse to said selected plane, said force being sufficient to establish contact between said end portion of said anode lead wire and said anode lead of said capacitor body and welding said end portion to said anode lead while said force is applied.

2. As an article of manufacture, a solid electrolytic capacitor having a substantially cylindrical body including an anode, an anode lead out wire in contact with and connected to the anode and extending along the longitudinal axis of said cylindrical body, a dielectric layer on the anode, a solid electrolytic cathode layer on the dielectric layer; a pair of resilient wires substantially coaxial with each other and the longitudinal axis of said cylindrical body, each wire of said pair having resiliently deformable extended portions substantially coaxial and substantially lying in a selected plane containing the longitudinal axis of said cylindrical capacitor body, one said wire of said pair of wires being an anode lead wire having an end portion transverse to the longitudinal axis of said cylindrical body and lying substantially in said selected plane and said end portion being welded to said anode lead out wire of said capactior body, the other wire of said pair of wires being the cathode lead wire having an arcuate portion spaced from said end portion of said anode lead wire and lying in a plane transverse to said selected plane, said arcuate portion having a shape generally conforming to the substantially cylindrical body and surrounding from about ⅛ to ½ of the circumference of said cylindrical capacitor body and being soldered thereto.

* * * * *